United States Patent [19]

Hibbitt et al.

[11] Patent Number: 5,433,043
[45] Date of Patent: Jul. 18, 1995

[54] WALL MOUNTED BOARD ASSEMBLY AND METHOD

[75] Inventors: Martin P. Hibbitt, Oswestry; Neale Pryce-Hughes, Mochnant Powys, both of Great Britain

[73] Assignee: Richard Burbidge Limited, Oswestry, England

[21] Appl. No.: 45,960

[22] Filed: Apr. 12, 1993

[30] Foreign Application Priority Data

Apr. 11, 1992 [GB] United Kingdom .................. 9208055

[51] Int. Cl.$^6$ .............................................. F04F 19/02
[52] U.S. Cl. ...................... 52/27; 52/718.01; 52/718.02
[58] Field of Search ............... 52/506, 38, 174, 511, 52/716.1, 718.01, 718.02, 287.1, 288.1, 27, 33, 34, 35, 182, 184, 506.05; 256/1, 59, 65; 411/388, 389, 455, 458, 460, 475

[56] References Cited

U.S. PATENT DOCUMENTS

| | | | |
|---|---|---|---|
| 313,681 | 3/1885 | Overell | 411/460 |
| 346,148 | 7/1886 | Durham | 411/388 |
| 482,742 | 9/1892 | Hoffend | 52/718.02 |
| 736,121 | 8/1903 | Lipscomb | 411/388 |
| 920,808 | 5/1909 | Alcott | 411/388 |
| 1,022,106 | 4/1912 | Murphy | 411/455 |
| 1,221,444 | 4/1917 | Hamilton | 52/718.02 |
| 3,300,192 | 1/1967 | Blum et al. | 256/65 |
| 4,779,393 | 10/1988 | Jong | 411/388 |

FOREIGN PATENT DOCUMENTS 2236777 4/1991 United Kingdom ............ 52/718.01

*Primary Examiner*—Michael Safavi
*Attorney, Agent, or Firm*—Caesar, Rivise, Bernstein, Cohen & Pokotilow, Ltd.

[57] ABSTRACT

A masonry nail (10) having two pointed end portions (11,12) is used to mount a board (24) in a wall (22). One end portion (12) is driven into the wall using a tool leaving the other end portion (11) projecting forward. The board (24) is urged on to the nail (11) so that the board is mounted on the wall without damaging the front face of the board. The end portion (11) may have threads (13) and the rear of the board may have a groove (37).

6 Claims, 2 Drawing Sheets

WALL MOUNTED BOARD ASSEMBLY AND METHOD

The invention relates to a method for connecting a board member to a support such as a wall in a direct and simple way. The invention is especially useful in the case of boards having an aesthetically pleasing surface finish which can easily be marred.

An operator will usually fix a board to a wall, e.g. a brick wall by hammering masonry nails through the board member. The head of the nails will need to be masked, e.g. by applying a settable filler material followed by overpainting. The holes can also be concealed by plugs which however may work themselves loose.

Recently new materials have become available as board members to be fixed to walls. One example is medium density fibreboard which typically is homogeneous sheet material made from wood fibres bonded by a synthetic resin binder, usually urea formaldehyde or melamine urea formaldehyde or the like. The density of the board usually ranges from about 600 kg/m$^3$ to about 900 kg/m$^3$ and the board ranges from about 1.6 mm to about 600 mm thick. Usually both faces are sanded until they are smooth.

Unfortunately it is not possible to drive a nail from the front of the board into the wall because the appearance is marred in a way which cannot be concealed.

It is one object of this invention to provide a method of mounting a board member onto a wall so that the connection is concealed, is made easily and is so secure that it can carry loads.

According to the invention in one aspect there is provided a wall mounted board, the board being made of timber or pressed fibre board, a finish being present on the front face of the board, at least one nail holding the board to the wall, the nail having one pointed end portion in the wall and one pointed end portion in contact with the board characterised in that the nail is a masonry nail and one end portion of the masonry nail is anchored in the material of the wall and the other end portion of the nail is anchored in the thickness of the board.

According to the invention in another aspect there is provided a method of mounting a board formed of timber or pressed fibre on a wall surface by means of a nail having two pointed ends, the method comprising:
anchoring one pointed end portion of a masonry nail in the material of the wall so that the nail has a forward projecting second pointed end portion to engage the board, and
urging the board on to the second end portion of the nail to cause the second end portion to penetrate into the thickness of the board but not to reach the front face thereof.

Most preferably the nail has a collar to separate the two end portions which collar may serve as a keying element in the tool by which the nail is to be driven into the material of the wall. In a further preferred feature a washer to spread the load is present associated with the collar, so that when the board is urged into place little or no damage is done to the wall. This is especially important where the wall is made of an impact prone material such as breeze block or aerated concrete and in the case where the board is tougher than the wall as a result of which urging the board on to the nail would tend to urge the nail further into the relatively weaker wall material.

The nails are preferably masonry nails i.e. made of a masonry quality steel or the like. Typically the steel has been surface hardened, e.g. carbonitrided or a like process. The end portions may be contoured according to the substrate into which each end portion is to be driven. Usually a tapered length will suffice for the end portion to be driven into the wall, whereas for the portion to engage the board member it is preferred to have a shank of substantial constant cross-section provided with ribs or threads. The end portions may be of different lengths and the collar will then be disposed in an appropriate position.

In a much preferred aspect the board is provided with a longitudinal groove in its rear face to act as a locating means so that when the operator offers the board up he can be confident that it is properly located. If the nails are anchored in horizontal alignment, which is relatively simple to do, and the board is then urged on to the nails, the board will be suitably aligned. The groove may be shaped to receive collars present on the nails, e.g. may be of inwardly tapering section.

Preferably the method includes the use of a punch or mounting tool, comprising a driving shaft of complementary profile to an end of the nail. The tool may be a double-headed tool, for example a driving shaft with hollow ends, so that each nail end portion is associated with a respective fastener end.

In another aspect the invention provides a masonry nail having two pointed end portions.

In yet another aspect the invention provides a board formed of medium density fibreboard, having a finish on a front face and a groove on its rear face.

There now follows a description of a specific embodiment of the invention, given by way of example only, with reference to the accompanying diagrammatic drawings, in which.

Figure 4:
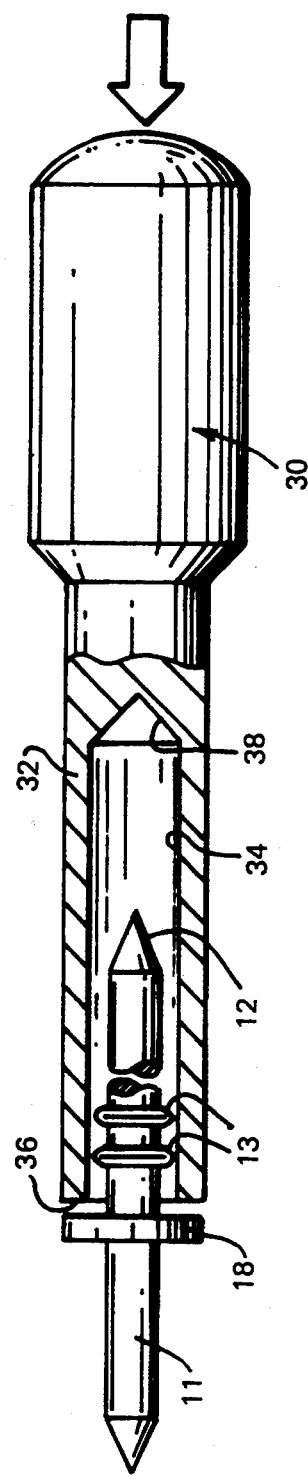
FIG. 4 shows the nail together with an impact driving tool toll therefor.

A double-headed nail comprises a cylindrical shank 10 with opposite tapered end portions 11, 12. The nail is made of masonry quality hardened steel. A collar 18 is present to limit the distance to which the nail is hammered into a wall 22 made of brick, breeze block, aerated concrete, timber framework or the like. The nail directly engages the material of the wall and no wedge or sleeve need be present between the nail and the material of the wall. The collar 18 may be used as an abutment for a hand gripped driving tool 30 shown in FIG. 4. Thus an annular end surface 36 of a hollow cylindrical tool shank 32 may engage the shoulder 18 directly or in conjunction with an abutment between the complementary profiled end face 38 of a cylindrical hollowed core 34, which is otherwise a circumferential clearance fit around the nail 10. The tool driving axis is aligned with the nail axis, so that impact percussion blows upon the tool head drive the nail into the wall.

Figure 1:
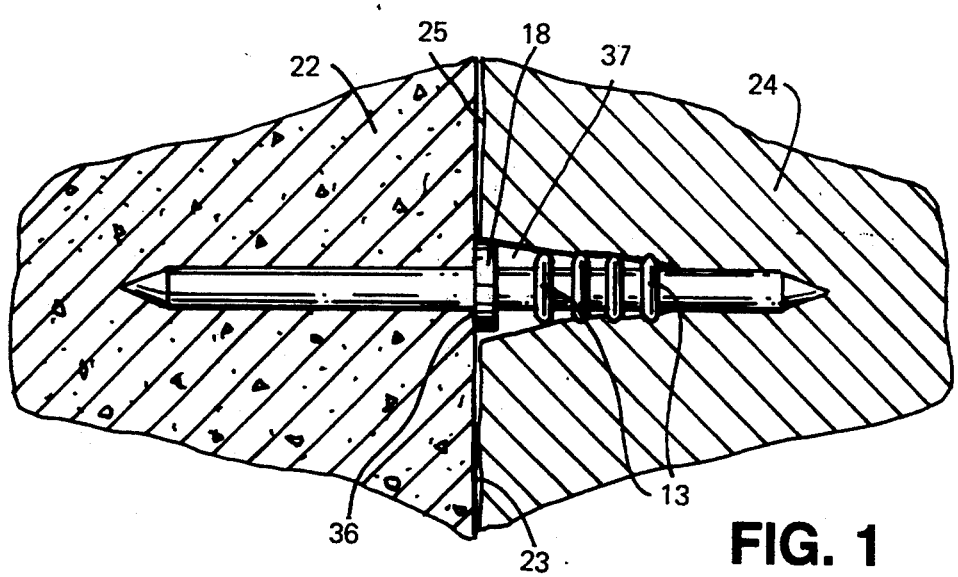
FIG. 1 is a cross section through an assembly comprising a board member anchored onto a masonry nail anchored in a wall.
Figure 2:
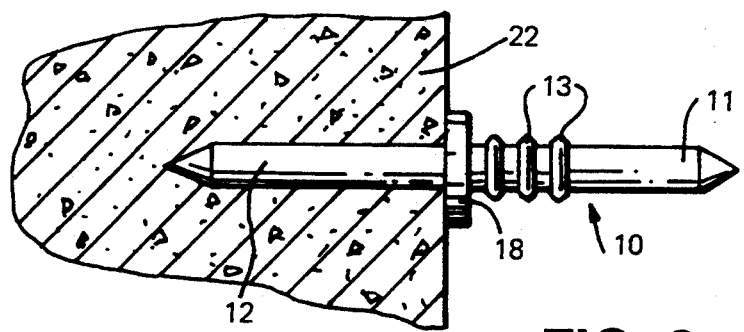
FIG. 2 shows the nail of FIG. 1 anchored in a wall.

FIG. 2 shows the nail end portion 10 anchored in the wall 22, with the collar 18 in abutment with the surface 23 thereof, leaving the other end portion 11 projecting forward to receive the board member 24. The end portion 11 has appropriately shaped threads 13 shaped to anchor in the board member 24. As shown, the threads define substantially parallel ridges adapted to engaging a board made of compressed fibres.

Figure 3:
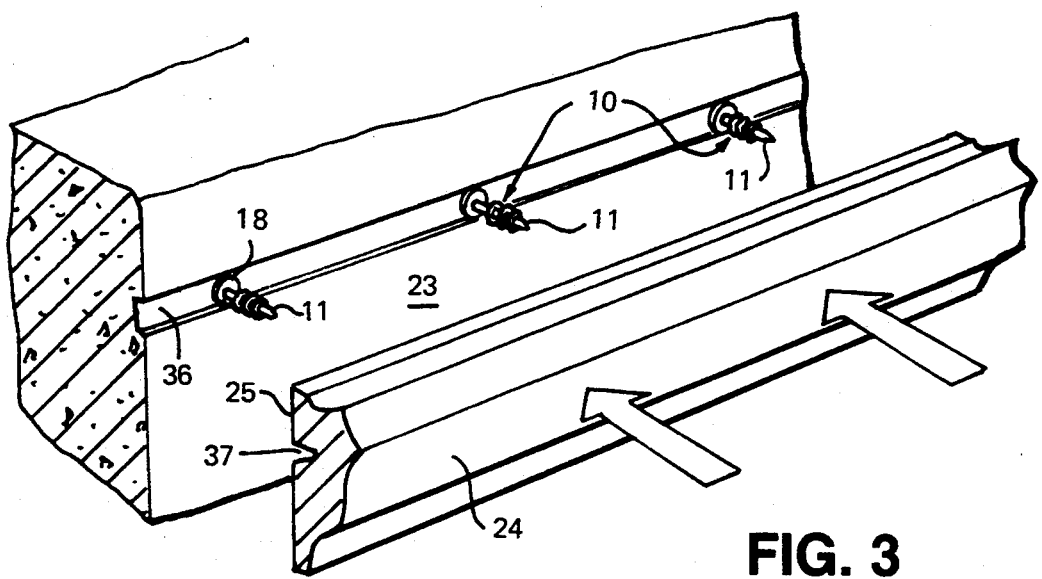
FIG. 3 shows a row of nails anchored in a wall ready for connection to the board.

FIG. 3 shows a step in which the board 24 is urged on to a row of the nails 10, until its rear surface 25 abuts the collar 18 (which in turn can be accommodated in complementary recesses 36 and/or groove 37 in the wall 22 and board 24 respectively). This may be achieved simply by offering up the board 24 and striking the face, either with the hand, a soft-faced hammer or mallet. Because the nails have been fixed accurately in the groove 37 the board will be aligned true, even though the operator cannot see the nails.

Further movement of the nail into the wall 22 when the board is hammered home is prevented by the collar 18, and thus a reaction force is generated which drives the outer end of the fastener into the rear of the board 24. A load spreading washer may be present to spread the load where the wall is made of say breeze block or aerated concrete and to prevent the nail being driven too far into the wall.

The board 24 may be of timber or medium density fibre board. Preferably the board has a finish on the front face and may take a variety of forms. The finish may be a paint, or lacquer, stain or veneer, or an applied preform sheet, e.g. decorative paper, polyvinylchoride foil or melamine foil; or a heat transfer foil. Opaque paints are preferred because their high solids content allows a high build. For a smooth even finish a base coat and a top coat suffice. Water or spirit-based stain is often applied first, followed by a high build lacquer. Pigmented lacquers may be used, and cellulose based lacquers. Polyurethane compositions and pre-catalysed and acid-catalyzed polyester compositions may be used.

By the method of the invention the professional or amateur can easily mount a board on a wall.

We claim:

1. A wall mounted board assembly, the board being made of pressed fiber board, a finish being present on the front face of the board and a groove being present along the rear face of the board, the board being held to the wall by a row of masonry nails, each nail having two end portions, one of which is anchored in the wall and the other being anchored in the thickness of the board, each nail having a collar to separate the two end portions thereof, the collar being arranged to serve as a keying element in a tool by which the nail is to be driven into the material of the wall, the end portion of the nail anchored in the thickness of the board having spaced apart parallel ridges whereby the board has been easily aligned on the wall.

2. The assembly of claim 1 wherein the board is formed of medium density fiberboard.

3. The assembly of claim 1 wherein the wall is formed of brick.

4. The assembly of claim 1 wherein the wall is formed of breeze block.

5. The assembly of claim 1 wherein the wall is formed of aerated concrete.

6. The assembly of claim 1 wherein the wall is formed of timber framework.

* * * * *